United States Patent
Sugiyama

(10) Patent No.: US 6,192,077 B1
(45) Date of Patent: Feb. 20, 2001

(54) CODING AND DECODING APPARATUS WITH MOTION COMPENSATION

(75) Inventor: Kenji Sugiyama, Yokosuka (JP)

(73) Assignee: Victor Company of Japan, Ltd., Yokohama (JP)

( * ) Notice: Under 35 U.S.C. 154(b), the term of this patent shall be extended for 0 days.

(21) Appl. No.: 09/007,106

(22) Filed: Jan. 14, 1998

(30) Foreign Application Priority Data

Jan. 31, 1997 (JP) .................................... 9-033121

(51) Int. Cl.[7] .................................................. H04N 7/12
(52) U.S. Cl. ........................................................ 375/240.12
(58) Field of Search ................................... 348/402, 407, 348/409, 413, 416; 382/232, 233

(56) References Cited

U.S. PATENT DOCUMENTS

| | | | | |
|---|---|---|---|---|
| 5,315,326 | * | 5/1994 | Sugiyama ............................ | 348/416 |
| 5,337,086 | * | 8/1994 | Fujinami .............................. | 348/402 |
| 5,379,351 | * | 1/1995 | Fandrianto et al. ................. | 348/407 |
| 5,767,909 | | 6/1998 | Jung ..................................... | 348/403 |

FOREIGN PATENT DOCUMENTS

| | | |
|---|---|---|
| 0556507A1 | 8/1993 | (EP) . |
| 0651582A2 | 5/1995 | (EP) . |
| 0731614A2 | 9/1996 | (EP) . |

OTHER PUBLICATIONS

Michael Nickel et al, SPIE, vol. 1605, A Hybrid Coder for Image Sequences Using Detailed ..., pp. 963–971, Nov. 11, 1991.

* cited by examiner

*Primary Examiner*—Chris S. Kelley
*Assistant Examiner*—Allen Wong
(74) *Attorney, Agent, or Firm*—Jacobson, Price, Holman & Stern, PLLC

(57) ABSTRACT

A coding/decoding apparatus performs predictive coding/decoding with motion compensation. A plurality of motion vectors are unified corresponding to motion of portions of a picture to obtain a motion vector group arranged in two-dimensional block. Motion vectors in the group are converted into one-dimension to obtain another motion vector group arranged in one-dimension. A motion vector value in the other group is predicted from another motion vector in the same group to obtain a motion vector predictive residue. The motion vector predictive residue is then coded with variable-length codes including zero run length codes to obtain a bitstream per motion vector group. The bitstream of motion vector groups composed of variable-length codes including zero run length codes are decoded to obtain a fixed-length motion vector predictive residue. A predictive value obtained from another motion vector is added to the fixed-length motion vector predictive residue to obtain motion vectors as a one-dimensionally arranged motion vector group. The one-dimensionally arranged motion vector group is converted into two-dimension to obtain a two-dimensionally arranged motion vector group in which motion vectors are unified in vertical and horizontal directions. Each vector in the two-dimensionally arranged motion vector group is output in accordance with motion compensation processing to each portion of a picture.

6 Claims, 6 Drawing Sheets

CODING AND DECODING APPARATUS WITH MOTION COMPENSATION

BACKGROUND OF THE INVENTION

This invention relates to a coding apparatus that efficiently encodes picture data to digital signals with less code amounts by motion compensation to effectively transmit, store and display pictures and a decoding apparatus for decoding the picture data.

There is a prediction method in moving picture efficient coding that displaces, prior to prediction, portions of a picture per block in accordance with the motion of the picture in inter-picture prediction.

This picture spatial displacement is called motion compensation and has widely been employed in international standard system, such as MPEG.

When the motion compensation is applied in the inter-picture prediction, picture motion information (motion vector) is also coded. Because motion compensation the same as that in coding must be done in decoding.

FIG. 1 shows a block diagram of a conventional coding apparatus with motion compensation.

In FIG. 1, an image (picture) signal is supplied to a subtracter 2 via input terminal 1. The subtracter 2 subtracts an inter-picture predictive signal from the input image signal. The inter-picture predictive signal is supplied by a motion compensated predictor 6. The subtracter 2 then generates an inter-picture predictive residue signal that is supplied to a discrete cosine transformer (DCT) 3.

The discrete cosine transformer 3 processes the inter-picture predictive residue signal by discrete cosine transforming per 8×8 pels to generate coefficients that are supplied to a quantizer 4. The quantizer 4 quantizes the coefficients by a predetermined quantization step width to generate fixed-length coded coefficients. The fixed-length coded coefficients are supplied to an arrangement converter 5.

The arrangement converter 5 rearranges two-dimensional 8×8 coefficients in one-dimension in Zigzag scanning order. The coefficients rearranged in one-dimension are supplied to a variable-length encoder 10.

The variable-length encoder 10 encodes a run length of zeros and other values of the coefficients by Huffman coding to generate a bitstream.

The bitstream of the inter-picture predictive residue is multiplexed by a multiplexer 15 with a bitstream of motion vectors and output via output terminal 16.

The fixed-length coded coefficients are also supplied to a dequantizer 9 and then to an inverse-discrete cosine transformer (IDCT) 8. The dequantizer 9 and the inverse-discrete cosine transformer 8 perform the reverse processing of the quantizer 4 and the discrete cosine transformer 3, respectively, to reproduce the inter-picture predictive residue signal that is supplied to an adder 7.

The adder 7 adds the inter-picture predictive residue signal and the inter-picture predictive signal to reproduce the image signal that is supplied to the motion compensated predictor 6.

The motion compensated predictor 6 stores one frame picture and displaces the picture per block in accordance with the motion vectors supplied from a motion estimator 12 to generate a motion-compensated inter-picture predictive signal. The inter-picture predictive signal is supplied to the subtracter 2 and the adder 7.

The motion vectors are obtained per block from the input image signal by the motion estimator 12. Each block is composed of the array in the range of (8×8) and (16×16) pels. The motion vectors thus obtained are also supplied to a predictive subtracter 13.

The predictive subtracter 13 compares vector values of an already coded block and a block to be coded per "x" and "y" components to generate residue values that are supplied to a variable-length encoder 14.

The variable-length encoder 14 encodes the residue values by Huffman coding to generate a bitstream.

The generated bitstream is multiplexed with the bitstream of the inter-picture predictive residue signal by the multiplexer 15 as described above.

FIG. 2 shows a block diagram of a conventional decoding apparatus with motion compensation.

The coded signal output from the coding apparatus of FIG. 1 is supplied to a demultiplexer 18 via input terminal 17 to be divided into the bitstreams of the inter-picture predictive residue signal and the motion vectors.

The bitstream of the inter-picture predictive residue signal is decoded by a variable-length decoder 19 to be the fixed-length codes.

The fixed-length codes are supplied to a reverse arrangement converter 20 that performs the reverse processing of the arrangement converter 5 of FIG. 1 to obtain (8×8) array of coefficients.

The coefficients are supplied to a dequantizer 21 and then to an inverse-discrete cosine transformer (IDCT) 22 to reproduce the inter-picture predictive residue signal.

The inter-picture predictive residue signal is supplied to an adder 23 and added to an inter-picture predictive signal to reproduce the image signal.

The reproduced image signal is output via output terminal 24 and supplied to a motion compensated predictor 27.

The motion compensated predictor 27 generates the inter-picture predictive signal in accordance with the motion vectors supplied from a predictive adder 26.

The bitstream of the motion vectors divided by the demultiplexer 18 is supplied to a variable-length decoder 25 that performs the reverse processing of the variable-length encoder 14 of FIG. 1 to obtain the residue values of the motion vectors.

The residue values are supplied to the predictive adder 26 where vector values of an already decoded block are added to the residue values to obtain motion vectors. The motion vectors are supplied to the motion compensated predictor 27 as described above.

The conventional coding apparatus described above has the following drawbacks:

Since motion vectors do not involve change, a code is generated per motion vector even if a residue value is zero. Further, when motion vectors gradually change in a zoomed scene, many codes are generated even if the change is monotonous.

Therefore, the conventional coding apparatus cannot compress the generated code amount effectively. Further, the conventional coding apparatus must be provided with motion compensation circuitry because the motion compensation is executed by a method completely different from that of inter-picture predictive residue coding.

SUMMARY OF THE INVENTION

A purpose of the invention is to provide a coding apparatus that effectively encodes moving picture data with motion compensation circuitry that can also be used to encode the inter-picture predictive residue.

Another purpose of the invention is to provide a decoding apparatus for decoding the moving picture data coded by the above coding apparatus.

The present invention provides a coding apparatus with motion compensation comprising: a unifier to unify a plurality of motion vectors corresponding to motion of portions of a picture to obtain a first motion vector group arranged in two-dimensional block; an arrangement converter to convert motion vectors in the first motion vector group into one-dimension to obtain a second motion vector group arranged in one-dimension; a vector predictor to predict a motion vector value in the second motion vector group from another motion vector in the second motion vector group to obtain a motion vector predictive residue; and a encoder to encode the motion vector predictive residue with variable-length codes including zero run length codes to obtain a bitstream per motion vector group.

Further, the present invention provides a decoding apparatus with motion compensation comprising: a decoder to decode a bitstream of motion vector groups composed of variable-length codes including zero run length codes to obtain a fixed-length motion vector predictive residue; an adder to adds a predictive value obtained from another motion vector to the fixed-length motion vector predictive residue to obtain motion vectors as a one-dimensionally arranged motion vector group; an arrangement converter to convert the one-dimensionally arranged motion vector group into two-dimension to obtain a two-dimensionally arranged motion vector group in which motion vectors are unified in vertical and horizontal directions; and a sequencer to output each vector in the two-dimensionally arranged motion vector group in accordance with motion compensation processing to each portion of a picture.

DETAILED DESCRIPTION OF THE PREFERRED EMBODIMENTS

Figure 3:
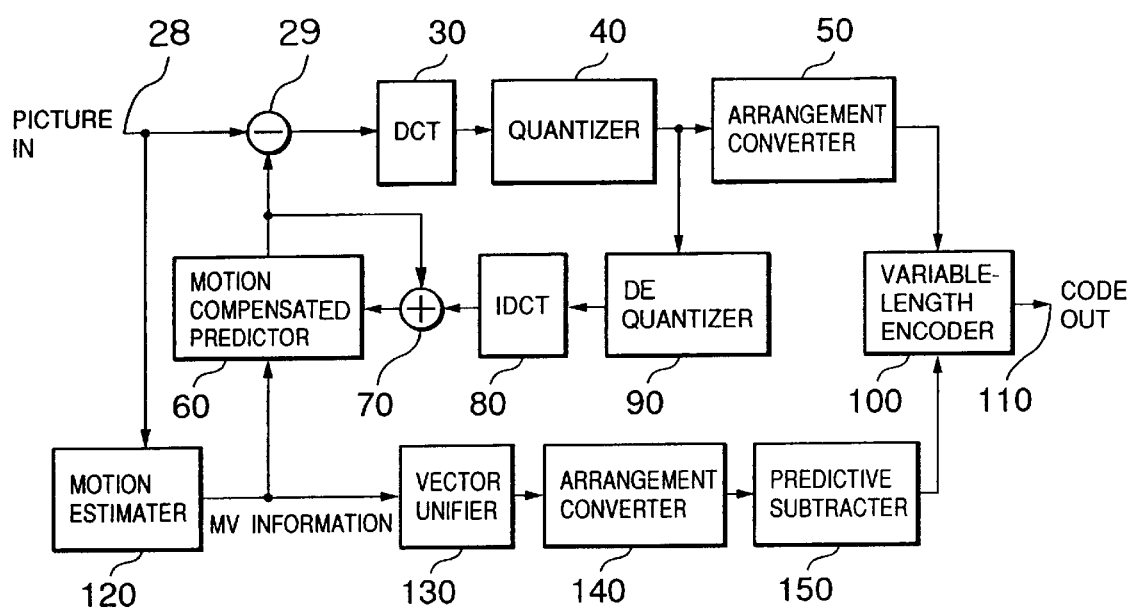
FIG. 3 shows a block diagram of a preferred embodiment of a coding apparatus according to the present invention.

FIG. 3 shows a block diagram of a preferred embodiment of a coding apparatus according to the present invention.

In FIG. 3, an image (picture) signal is supplied to a subtracter 29 via input terminal 28. The subtracter 29 subtracts an inter-picture predictive signal from the input image signal. The inter-picture predictive signal is supplied by a motion compensated predictor 60. The subtracter 29 then generates an inter-picture predictive residue signal that is supplied to a discrete cosine transformer (DCT) 30.

The discrete cosine transformer 30 processes the inter-picture predictive residue signal by discrete cosine transforming per 8×8 pels to generate coefficients that are supplied to a quantizer 40. The quantizer 40 quantizes the coefficients by a predetermined quantization step width to generate fixed-length coded coefficients. The fixed-length coded coefficients are supplied to an arrangement converter 50 and a dequantizer 90.

The arrangement converter 50 rearranges two-dimensional 8×8 coefficients in one-dimension in Zigzag scanning order. The coefficients rearranged in one-dimension are supplied to a variable-length encoder 100.

The input image signal is also supplied to a motion estimator 120 that outputs motion vector (MV) information per block of the image signal. The MV information is supplied to the motion compensated predictor 60 and a vector unifier 130.

The vector unifier 130 unifies 64 vectors (4 in vertical and 16 in horizontal direction) into a vector group. Here, the 64 vectors can be composed of 8×8 in vertical and horizontal directions. However, the less in the vertical direction, the more advantageous for signal processing in the order similar to the input image signal or code error protection along a transmission line at a coding side. In this embodiment, the total number of vectors is set as 64 for adjusting this prossing with (8×8) DCT processing described later.

Figure 4:
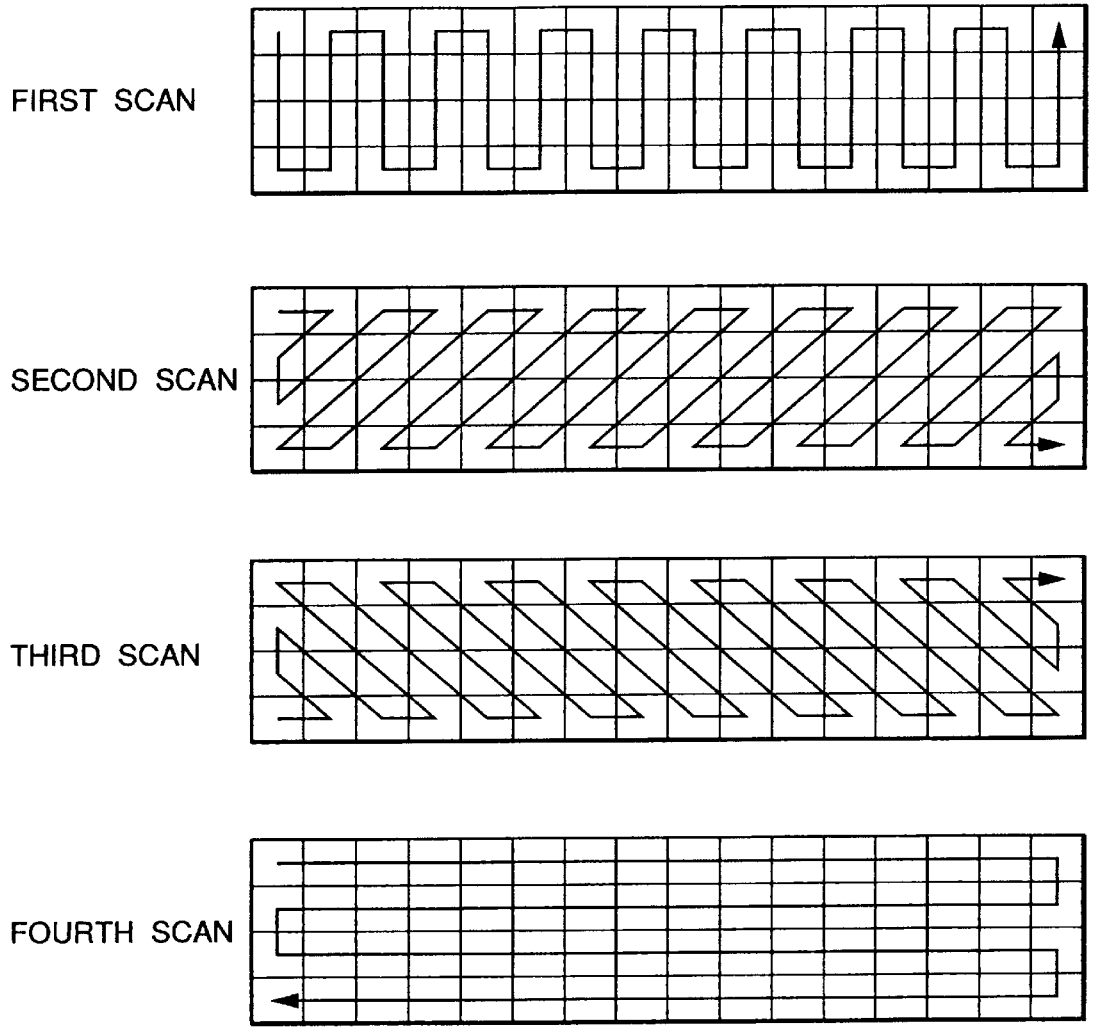
FIG. 4 illustrates four types of scanning order in arrangement conversion according to the present invention.

The vector group is then supplied to an arrangement converter 140. The converter 140 scans the vector group with one of four scanning patterns as shown in FIG. 4 to rearrange the vector group in one-dimension. The rearranged vector group is supplied to a predictive subtracter 150.

Figures 5, 6:
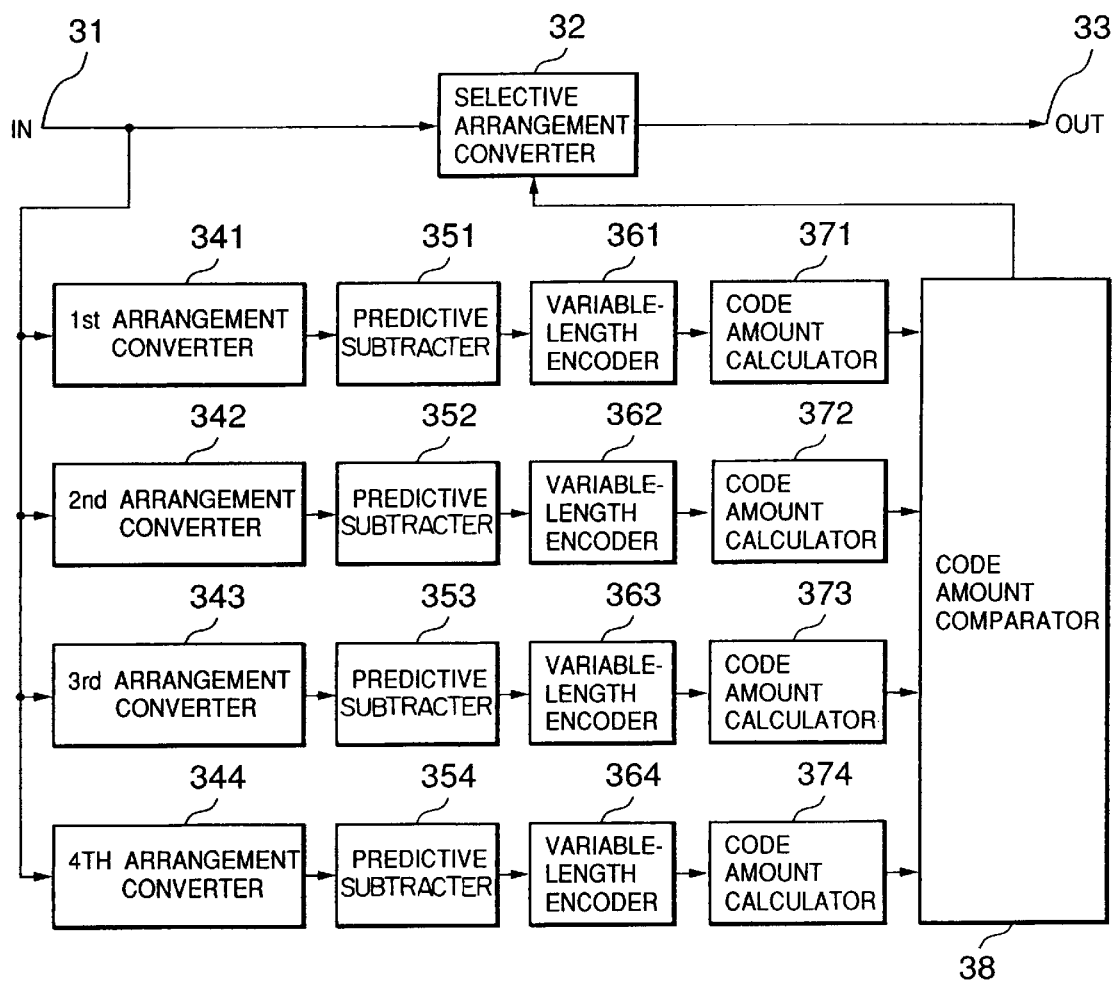
FIG. 5 illustrates motion vector value prediction according to the present invention.
FIG. 6 shows a block diagram of an arrangement converter according to the present invention.

The predictive subtracter 150 compares vector values of an already coded block and a block to be coded per "x" and "y" components to generate residue values. Or, the predictive subtracter 150 can perform slant (incline) prediction using prior two values as shown in FIG. 5. Here, prior value and slant predictions are expressed by x=b and x=2b−a, respectively, where "x" is a predictive value to a vector to be coded, "b" a prior predictive value and "a" one more prior predictive value.

The prior value prediction always generates a predictive residue when a motion vector is gradually changing, for example, in a zooming scene. On the contrary, the slant prediction generates less predictive residue because vector value change is also predicted.

These predictions are performed after the motion vector values are decided. Therefore, local decoding processing required for inter-picture prediction is not needed in this embodiment. Furthermore, the vector values are converted into predictive residues while the vector order in the one-dimensional arrangement is not changed.

A predictive residue value of each motion vector is supplied to the variable-length encoder 100. The encoder 100 encodes the predictive residue by Huffman coding. More, in detail, the encoder 100 encodes both the predictive residue value and the motion vectors.

The predictive residue value and the motion vector have the same number of data and their characteristics are very similar to each other. Therefore, they can be encoded by the variable-length encoder 100 with the same coding method. Most of the values of the predictive residue value and the motion vector are zero. The variable-length encoder 100 thus encodes a run of zeros and other values by Huffman coding.

As described above, continuous zeros can be combined into a variable-length code to achieve highly efficient coding, unless the motion vector change is not very complex.

Figure 1:
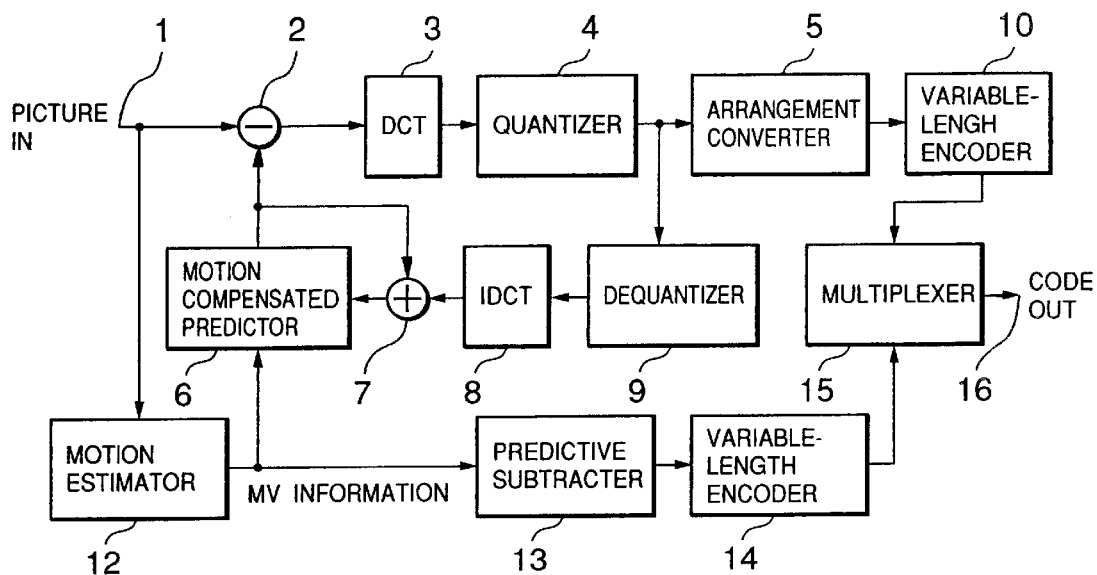
FIG. 1 shows a block diagram of a conventional coding apparatus.
Figure 2:
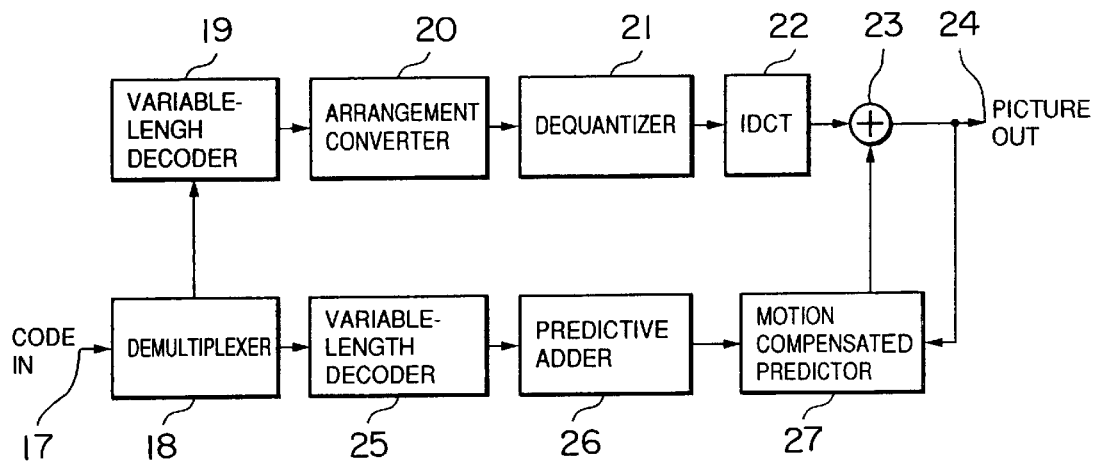
FIG. 2 shows a block diagram of a conventional decoding apparatus.

Further, two residue values of the motion vectors are generated per block and hence extremely less than the DCT coefficients. The performance of the variable-encoder 100 is enough to be almost the same as that of the variable-encoder 10 of FIG. 1 for coding the predictive residue.

Furthermore, both the inter-picture predict residue and the motion vectors are fixed-length codes so that the output bitstream of the variable-length encoder 100 is identical to the multiplex of the inter-picture predictive residue and the motion vectors by switching coding operation of the encoder 100. This is advantageous when compared to the conventional apparatus of FIG. 1 where the multiplexer 15 is needed to multiplex the variable-length codes from the variable-length encoders 10 and 14.

Next, the arrangement converter 140 will be described in detail.

Large coefficients get together aground the DC component in the two-dimensional DCT coefficients. The zigzag scanning starting from the DC component is thus effective.

The motion vectors show clustering in the direction where vector values are changing by motion, however, the direction is not steady. Thus, as described with reference to FIG. 4, four scanning patterns are provided to have a long continuous zero run length without respect to the clustering in the direction where vector values are changing by motion. Selection of the four scanning patterns is done by comparing the total code amounts of the unified 64 motion vectors to each other.

FIG. 6 shows a block diagram of the arrangement converter 140.

The motion vectors are supplied to a selective arrangement converter 32 and first to fourth arrangement converters 341 to 344 via input terminal 31. The arrangement converters 341 to 344 perform arrangement conversion with the scanning patterns as shown in FIG. 4.

The resultants of the scanning are supplied to predictive subtracters 351 to 354. The subtracters 351 to 354 perform the same processing of the predictive subtracter 150 of FIG. 3 to generate predictive residues.

The predictive residues are then supplied to variable-length encoders 361 to 364. Each encoder performs the same processing of the variable-length encoder 100 of FIG. 3. However, the encoders 361 to 364 do not generate codes but code lengths that are supplied to code amount calculators 371 to 374.

The calculators 371 to 374 accumulate the code lengths per vector group and supply code amounts to a code amount comparator 38.

The code amount comparator 38 compares the code amounts with each other to detect the least code amount that is supplied to the selective arrangement converter 32.

The selective arrangement converter 32 performs arrangement conversion to the input motion vectors with one of the scanning patterns of FIG. 4 selected in response to the least code amount. The information indicating which scanning pattern is selected is required in decoding. The information is thus attached to a header of the motion vector group.

Described next is the case where the image signal involves blocks for which motion vectors are not needed to be transferred. The blocks are those independently coded in a picture or bi-directional frames a portion of which is predicted from one direction not both directions. These blocks are present in usual coding systems, such as MPEG.

Figure 7A:
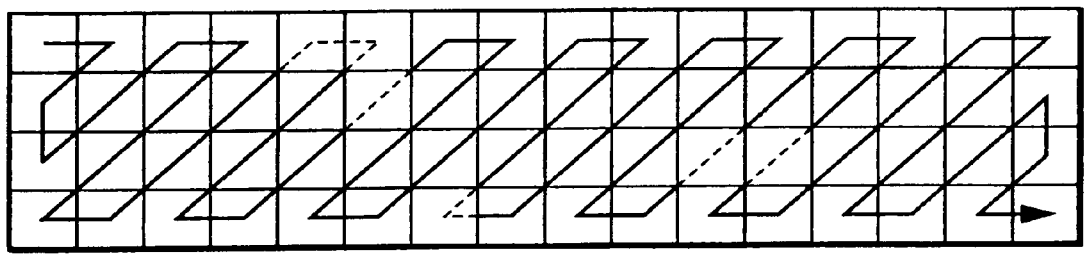
FIGS. 7A and 7B illustrate processing of blocks for which motion vectors are not needed.
Figure 7B:
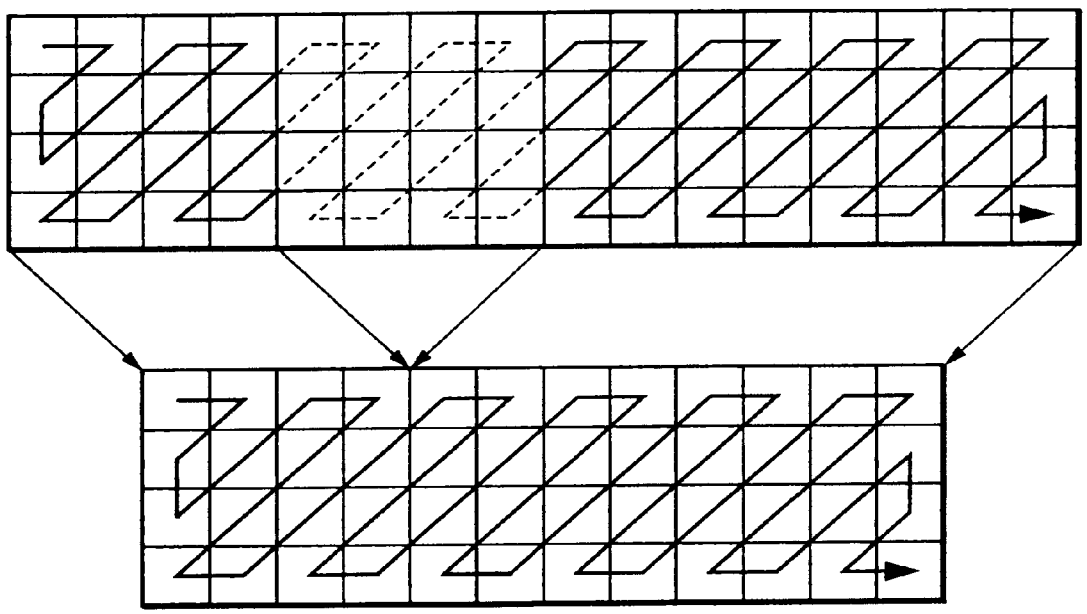

FIGS. 7A and 7B illustrate the cases where motion vectors are not needed.

FIG. 7A illustrates that the blocks for which moving vectors are not needed are scattered over a picture as shown by dot lines. In this case, blocks are scanned as shown by solid lines without scanning the blocks with the dot lines to proceed with vector coding.

In detail, the scanning is performed such that the blocks with the dot lines are treated as the motion vector residue is zero. In this case, decoding process will be simple. Or, the scanning is performed such that the gap is closed on the block for which the moving vectors are needed in front. The gap means the block for which moving vectors are not needed, that is, there is no data. In this case, zero run length will be shortened for the gap to achieve efficient coding.

FIG. 7B illustrates that the blocks for which moving vectors are not needed are close to each other as shown by dot lines in the upper drawing. In this case, those blocks are disregarded as shown in the lower drawing. This is performed by the arrangement converter 140.

Figure 8:
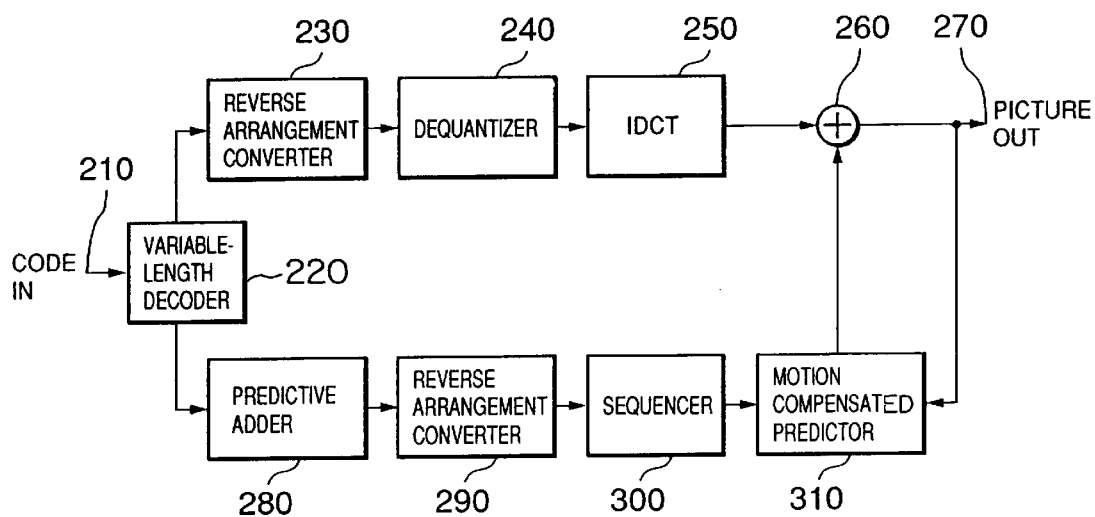
FIG. 8 shows a block diagram of a preferred embodiment of a decoding apparatus according to the present invention.

Next, FIG. 8 shows a block diagram of a preferred embodiment of a decoding apparatus according to the present invention.

The coded signal output from the coding apparatus of FIG. 3 is supplied to a variable-length decoder 220 via input terminal 210. The variable-length coded signal of runs of zero and level is converted into fixed length codes. The bitstream of the inter-picture predictive residue is supplied to a reverse arrangement converter 230. Further, the bitstream of the motion vector predictive residue is supplied to a predictive adder 280.

The reverse arrangement converter 230 performs the reverse processing of the arrangement converter 50 of FIG. 3 to obtain (8×8) array of coefficients.

The coefficients are supplied to a dequantizer 240 and then to an inverse-discrete cosine transformer (IDCT) 250 to reproduce the inter-picture predictive residue signal.

The inter-picture predictive residue signal is supplied to an adder 260 and added to an inter-picture predictive signal to reproduce the image signal.

The reproduced image signal is output via output terminal 270 and supplied to a motion compensated predictor 310.

The predictive adder 280 performs the reverse processing of the predictive substracter 150 of FIG. 3 to reproduce the one-dimensional motion vectors.

The reproduced vectors are supplied to a reverse arrangement converter 290. The converter 290 performs the reverse processing of the arrangement converter 140 of FIG. 3 to reproduce the two-dimensional motion vector group with one of the scanning patterns shown in FIG. 4.

The two-dimensional motion vector group is supplied to a sequencer 300. The sequencer 300 holds the motion vector values in the two-dimensional block and output the motion vector values in accordance with the processing order of the motion compensated predictor 310.

The reverse arrangement converter 290 will be described further in the case where the image signal involves blocks for which motion vectors are not needed to be transferred.

The vectors reproduced by the predictive adder 280 are processed by the reverse arrangement converter 290 as they are when zeros have been inserted into motion vector residues by the arrangement converter 140 of the coding apparatus shown in FIG. 3.

On the other hand, when scanning has been performed in coding such that the gap has been closed on the block for which the moving vectors are needed in front as already described, the motion vector positions are displaced.

Therefore, by prediction mode for each block, a blank (dummy) data, such as, motion vector residue "0" is put in an unneeded motion vector portion and then reverse arrangement is performed.

As described above, according to the present invention, the motion vectors are two-dimensionally unified and rearranged into one-dimensional arrangement; and predicted to generate predictive residue that is encoded by variable-length coding with zero run length.

Therefore, the less change in vector and more continuous zero, the less the generated code amount. This results in less code amount without data degradation with respect to the motion vectors to achieve higher coding efficiency.

Further, the present invention achieves the least code amount with a suitable scanning pattern selected among a plurality of scanning patterns for encoding.

Further, according to the present invention, the inter-picture predictive residue and the motion vectors are encoded by the same encoder. Therefore, coding processing circuitry and variable-length table are shared for the coding of the inter-picture predictive residue and the motion vectors. This results in a smaller apparatus configuration with less circuitry and memories.

Further, according to the present invention, scanning is performed such that the gap is closed on the block for which the moving vectors are needed in front for rearrangement. This results in less redundancy and higher coding efficiency.

What is claimed is:

1. A coding apparatus with motion compensation comprising:
    a unifier to unify a plurality of motion vectors corresponding to motion of portions of a picture to obtain a first motion vector group arranged in two-dimensional block;
    an arrangement converter to convert motion vectors in the first motion vector group from the two-dimensional block into predetermined one-dimension by scanning to obtain a second motion vector group arranged in the one-dimension;
    a vector predictor to predict a motion vector value in the second motion vector group from at least another motion vector value which has already been predicted in the second motion vector group in the order of the motion vectors converted into the one-dimension to obtain a motion vector predictive residue;
    an encoder to encode the motion vector predictive residue with variable-length codes including zero run length codes to obtain a bitstream per motion vector group; and
    wherein the arrangement converter performs arrangement conversion with a scanning pattern that is selected among a plurality of scanning patterns so as to have the least code amount in variable-length coding by the encoder.

2. A coding apparatus according to claim 1, wherein the motion vector predictive residue is encoded by an encoding technique the same as that for an inter-picture predictive residue encoded in motion compensated coding.

3. A coding apparatus with motion compensation comprising:
    a unifier to unify a plurality of motion vectors corresponding to motion of portions of a picture to obtain a first motion vector group arranged in two-dimensional block;
    an arrangement converter to convert motion vectors in the first motion vector group from the two-dimensional block into predetermined one-dimension by scanning to obtain a second motion vector group arranged in the one-dimension;
    a vector predictor to predict a motion vector value in the second motion vector group from at least another motion vector value which has already been predicted in the second motion vector group in the order of the motion vectors converted into the one-dimension to obtain a motion vector predictive residue;
    an encoder to encode the motion vector predictive residue with variable-length codes including zero run length codes to obtain a bitstream per motion vector group; and
    wherein the arrangement converter performs arrangement conversion after at least one motion vector not needing to be transferred is extracted from a position between an anterior motion vector and a posterior motion vector to be transferred and the posterior motion vector is shifted to a vacant space given due to the data extraction, leaving no empty space between the anterior and posterior motion vectors.

4. A decoding apparatus with motion compensation comprising:
    a decoder to decode a bitstream of motion vector groups composed of variable-length codes including zero run length codes to obtain a fixed-length motion vector predictive residue;
    an adder to add a predictive value obtained from at least one motion vector that has already been obtained to the fixed-length motion vector predictive residue to obtain motion vectors as a one-dimensionally arranged motion vector group in the order of the motion vectors that have been converted into one-dimension when coded;
    an arrangement converter to convert the one-dimensionally arranged motion vector group into two-dimension by scanning to obtain a two-dimensionally arranged motion vector group in which motion vectors are unified in vertical and horizontal directions;
    a sequencer to output each vector in the two-dimensionally arranged motion vector group in accordance with motion compensation processing to each portion of a picture; and
    wherein the arrangement converter performs arrangement conversion with one of a plurality of scanning patterns selected based on information transferred from a coding apparatus.

5. A decoding apparatus according to claim 4, wherein the motion vector predictive residue is obtained by a decoding technique the same as that for an inter-picture predictive residue generated in motion compensated decoding.

6. A decoding apparatus according to claim 4, wherein, the arrangement converter performs arrangement conversion such that blank data is put in a data portion between an anterior motion vector to be decoded and a posterior motion vector data to be decoded, the data portion corresponding to at least one motion vector that is not transferred because of no decoding needed.

* * * * *